(12) United States Patent
Levy (10) Patent No.: US 12,367,992 B2
(45) Date of Patent: Jul. 22, 2025

(54) MULTI-CABLE INTERCONNECT CONNECTION SYSTEM

(71) Applicant: MELLANOX TECHNOLOGIES, LTD., Yokneam (IL)

(72) Inventor: Ofer Levy, Kiryat Ono (IL)

(73) Assignee: Mellanox Technologies, LTD., Yokneam (IL)

( * ) Notice: Subject to any disclaimer, the term of this patent is extended or adjusted under 35 U.S.C. 154(b) by 541 days.

(21) Appl. No.: 17/743,123

(22) Filed: May 12, 2022

(65) Prior Publication Data
US 2023/0368944 A1    Nov. 16, 2023

(51) Int. Cl.
*H01R 12/71* (2011.01)
*H01B 9/00* (2006.01)

(52) U.S. Cl.
CPC ........... *H01B 9/005* (2013.01); *H01R 12/716* (2013.01); *H04Q 2213/1301* (2013.01)

(58) Field of Classification Search
CPC .................. H01B 9/005; H04Q 2213/1301; G06F 1/183; G06F 1/189
See application file for complete search history.

(56) References Cited

U.S. PATENT DOCUMENTS 9,154,860 B2    10/2015   Hessong et al.
2019/0293884 A1*  9/2019  Little ................... H01R 27/02

\* cited by examiner

*Primary Examiner* — Michael C Zarroli
(74) *Attorney, Agent, or Firm* — Sheridan Ross PC (57) ABSTRACT

A system for connecting cage-side connectors to PCB-side connectors. The system enables OSFP and QSFP pluggable modules to be connected to breakouts on PCBs within a networking device. The system includes one or more cage-side connectors connected via one or more cables to one or more PCB-side connectors. Keyed PCB-side connectors and unique lengths of cables ensure proper connections to headers on a PCB.

20 Claims, 9 Drawing Sheets

*PRIOR ART*

MULTI-CABLE INTERCONNECT CONNECTION SYSTEM

FIELD OF THE DISCLOSURE

The present disclosure is generally directed to connection systems, and more particularly to a system for interconnecting cage-side pluggable modules with printed circuit boards.

BACKGROUND

Contemporary computer systems such as a switch used for networking often include a case or cage comprising one or more components such as a Printed Circuit Board (PCB) or motherboard. Cables connect off-PCB modules to on-PCB modules. For example, a pluggable module built into the wall of the computer system may be connected to a PCB within the computer system.

SUMMARY

In an embodiment disclosed herein, a connection system comprising one or more cage-side connectors connected via cables to one or more PCB-side connectors enables a manufacturer or user of such a computer system to change the PCB or change the case without being restricted to using cables which are too long or too short. A connection system as described herein, may enabled a user to quickly determine where to plug each cable. For example, to which pluggable module should it be connected and to which PCB header or breakout should it be connected. A connection system as described herein enables a manufacturer or user to connect one or more lanes of a pluggable module to a breakout of a PCB and one or more other lanes of the pluggable module to a different breakout of the same PCB or another PCB. Similarly, using a connection system as described herein, a manufacturer or user is enabled to connect a breakout of a PCB to both one or more lanes of a pluggable module and one or more lanes of another pluggable module.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Datacenters are the storage and data processing hubs of the Internet. The deployment of cloud applications is causing datacenters to expand exponentially in size, stimulating the development of faster switches than can cope with the increasing data traffic inside the datacenter. Current state-of-the-art switches are capable of handling 12.8 Tb/s of traffic by employing electrical switches in the form of application specific integrated circuits (ASICs) equipped with 256 data lanes, each operating at 50 Gb/s. Such switching ASICs typically consume as much as 400 Watts, and the power consumption of the optical transceiver interfaces attached to each ASIC is comparable. To keep pace with traffic demand, switch capacity doubles approximately every two years. To date, rapid switch scaling has been made possible by exploiting advances in manufacturing (e.g., CMOS techniques), collectively described by Moore's law (i.e., the observation that the number of transistors in a dense integrated circuit doubles about every two years). However, in recent years there are strong indications of Moore's law slowing down, which raises concerns about the capability to sustain the target scaling rate of switch capacity. As a result, alternative technologies are being investigated.

Optical switches are one solution for enabling advances in networking due to the technology's potential for extremely high data capacity and low power consumption. Optical switches feature optical input and output ports and are capable of routing light that is coupled to the input ports to the intended output ports on demand, according to one or more control signals (electrical or optical control signals). Routing of the signals is performed in the optical domain, i.e., without the need for optical-electrical and electrical-optical conversion, thus bypassing the need for power-consuming transceivers. Header processing and buffering of the data is not possible in the optical domain and thus, packet switching (as it is realized in electrical switches) cannot be employed. Instead, the circuit switching paradigm is used: an end-to-end circuit is created for the communication between two endpoints connected on the input and the output of the optical switch.

Figure 1:
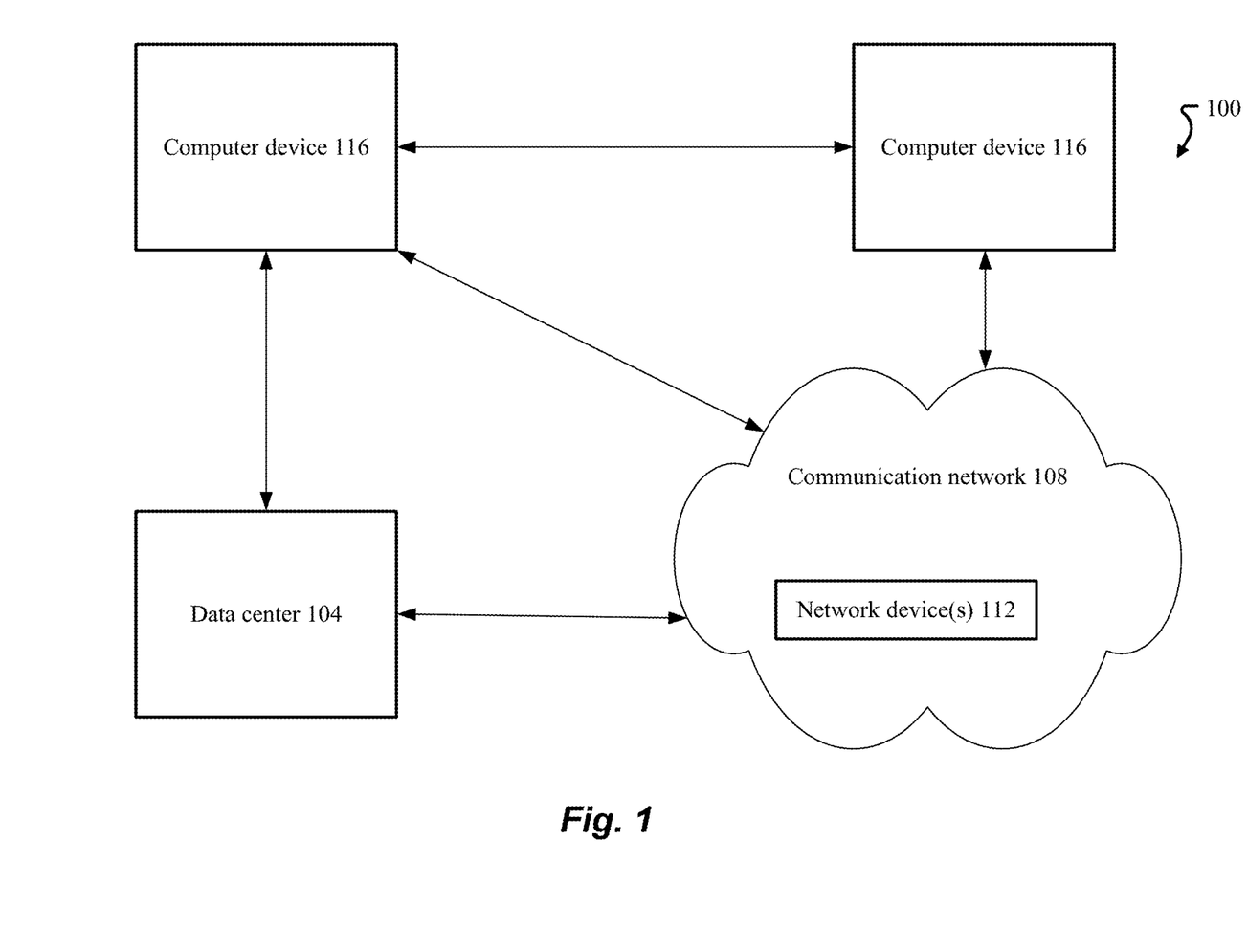
FIG. 1 is an illustration of a computing environment in accordance with one or more embodiments of the present disclosure.

FIG. 1 illustrates a computing environment 100 according to at least one example embodiment. The computing environment 100 includes a datacenter 104, computer devices 116, and a communication network 108. The communication network 108 may comprise one or more network devices 112. In at least one example embodiment, the datacenter 104 corresponds to a collection of network devices and computer devices 116, such as network switches (e.g., Ethernet switches) connected with a collection of servers or compute nodes. The datacenter 104 may adhere to a networking topology (e.g., a hierarchal networking topology), such as a fat tree topology, a Slim Fly topology, a Dragonfly topology, and/or the like. The datacenter 104 routes traffic amongst the network switches and servers therein, and at least one layer of the topology in the datacenter 104 is coupled to the communication network 108 to allow networking traffic to flow between the datacenter 104 and the network device(s) 112. As described in more detail below, one or more layers of the topology may comprise one or more hybrid optoelectrical switches according to inventive concepts.

Examples of the communication network 108 which may be used to connect the datacenter 104 and the network device(s) 112 include an Internet Protocol (IP) network, an Ethernet network, an InfiniBand network, a Fibre Channel network, the Internet, a cellular communication network, a wireless communication network, combinations thereof (e.g., Fibre Channel over Ethernet), variants thereof, and/or the like.

The one or more computer devices 116 may include one or more of switches, routers, network interface controllers (NICs), Personal Computer (PC), a laptop, a tablet, a smartphone, a server, a collection of servers, and/or any suitable computing device for sending and receiving signals over the communication network 108. In at least one example embodiment, the one or more network devices 112 correspond to another datacenter, similar to or the same as datacenter 104.

As noted above, the datacenter 104, the network device(s) 112, and/or the computer devices 116 may include storage devices and/or processing circuitry for conducting computing tasks, for example, tasks associated with controlling the flow of data internally and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally, or alternatively, the processing circuitry incorporated in a network device 112 and/or computer device 116 may comprise hardware, such as an application specific integrated circuit (ASIC). Other non-limiting examples of the processing circuitry include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the datacenter 104, network device(s) 112, and computer devices 116 may include one or more communication interfaces for facilitating wired and/or wireless communication between one another and other unillustrated elements of the system 100.

A computer device 116 may operate as an Ethernet switch, an InfiniBand switch, or another type of networking device. A computer device 116 may comprise, as described in greater detail below, an enclosure with external pluggable modules and one or more internal printed circuit boards (PCBs). The computing environment 100 may also comprise one or more data centers 104, a communication network 108, one or more network devices 112, and/or other components.

Each component of the computing environment 100 may be in communication with other components either directly or indirectly via the communication network 108.

Figure 2A:
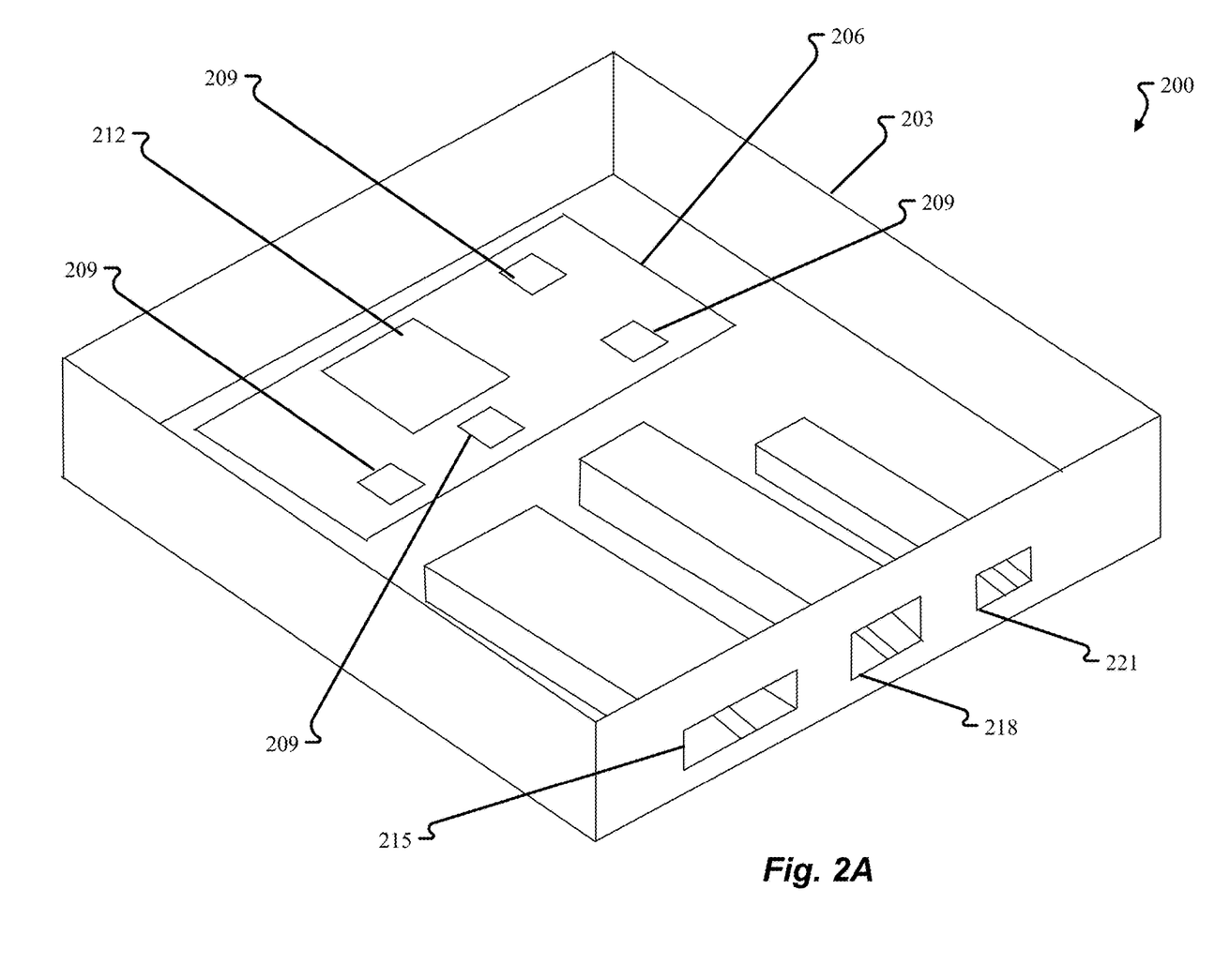
FIG. 2A is an illustration of a computing device in accordance with one or more embodiments of the present disclosure.

As illustrated in FIG. 2A, a computer device 200 may comprise an enclosure 203, the enclosure 203 of the computer device 200 may be referred to as a case or a cage. The computer device 200 illustrated in FIG. 2A is an example of a computer device 116 as illustrated in FIG. 1.

In some embodiments, a computer device 200 may comprise a switching device such as an ethernet switch, a Linux switch, an InfiniBand switch, or other type of component of a data center. A computer device 200 as described herein may comprise a data processing unit The enclosure 203 may contain one or more PCBs 206. Each PCB 206 may comprise one or more headers 209 which may allow for connections to be made to components on the PCB 206. Components on the PCB 206 may comprise, for example, an ASIC 212. For example, the PCB 206 may comprise a programmable ASIC configured for use in a data center as part of a data processing unit.

The enclosure 203 of the computer device 203 may comprise one or more pluggable modules such as an octal small form factor pluggable (OSFP) connector 215, a quad small form factor pluggable (QSFP) connector 218, a quad small form factor pluggable double density (QSFP-DD) connector 221, and/or other pluggable modules.

As should be appreciated, a pluggable module 215, 218, 221 may comprise an interior port and an exterior port. The interior port of the pluggable module may enable a cable to connect the pluggable module to components within the computer device 203. The exterior port of the pluggable module may enable a cable to connect the pluggable module to components outside the computer device.

A QSFP connector 218 is a type of hot-swappable transceiver supporting ethernet, fiber channel, InfiniBand, SONET/SDH, and other standards with a plurality of data rate options. A QSFP connector 218 may enable four lanes of data at data rates up to, for example, 28 Gbit/s each, enabling overall speeds of excess of 100 Gbit/s. Similarly, an OSFP connector 215 is an eight-lane hot-swappable transceiver capable of, for example, 800 Gbit/s. A QSFP-DD connector 221 is a small form factor hot-swappable transceiver capable of, for example, 400 Gbit/s using eight lanes.

By connecting an OSFP, QSFP, OSFP-DD, etc., interconnect cable to the connectors 215, 218, 221 of the computer device 203, data may be shared with other computer devices using one or more of Ethernet, Fibre Channel, InfiniBand, SONET/SDH standards, at various data rates.

Figure 2B:
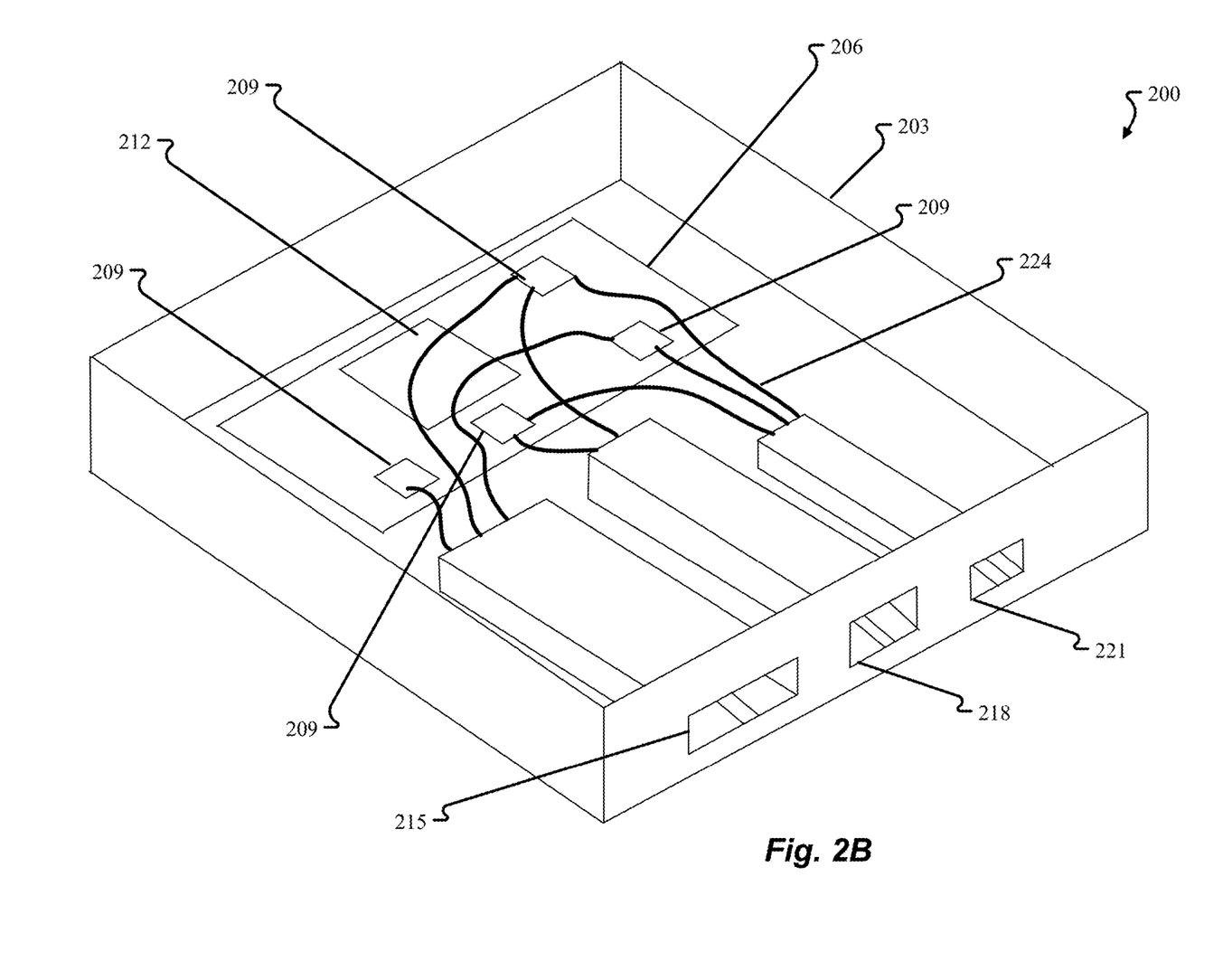
FIG. 2B is an illustration of a computing device in accordance with one or more embodiments of the present disclosure.

While the connectors 221, 215, 218 are illustrated in FIGS. 2A and 2B as one-by-one cage-side connectors, it should be appreciated that other formats, such as one-by-four cage-side connector may be used.

Internally to the computer device 203, each of the connectors 215, 218, 221 may connect externally plugged cables to one or more breakouts or headers 209 on the PCB 206. For example, as illustrated in FIG. 2B, each pluggable module 215, 218, 221 may be connected to one or more headers 209 on a PCB 206 via one or more cable systems 224.

Unlike conventional cables, which allow for each pluggable module to be connected to a single point on a PCB, the cable systems 224 as described herein may enable each lane of each pluggable module 215, 218, 221 to be managed independently if needed and connected to a particular point of a PCB independently, to multiple points of a PCB, or to multiple PCBs. For example, using a cable system 224 as described herein, a single pluggable module 215, 218, 221 may be connected to multiple PCBs 206 or to multiple points on one PCB 206, and/or multiple pluggable modules 215, 218, 221 may be connected to one or more PCBs 206 as described herein. As an example, one or more lanes from an OSFP may be connected to a first PCB, one or more other lanes from the same OSFP may be connected to a second PCB, and one or more other lanes from the OSFP may be connected to a third PCB.

The side of the cable system 224 connected to a pluggable module 215, 218, 221 may be referred to as a cage-side connector while the side of the cable system 224 connected to breakouts or headers 209 on the PCB 206 may be referred to as a PCB-side connector.

It should be appreciated a single cable system 224 may comprise a plurality of cage-side connectors and PCB-side connectors as described in greater detail below.

While the pluggable modules described herein relate to OSFP, QSFP, and OSFP-DD, it should be appreciated the same or similar connection systems may be used in relation to other types of pluggable transceivers having multiple lanes.

Figure 3A:
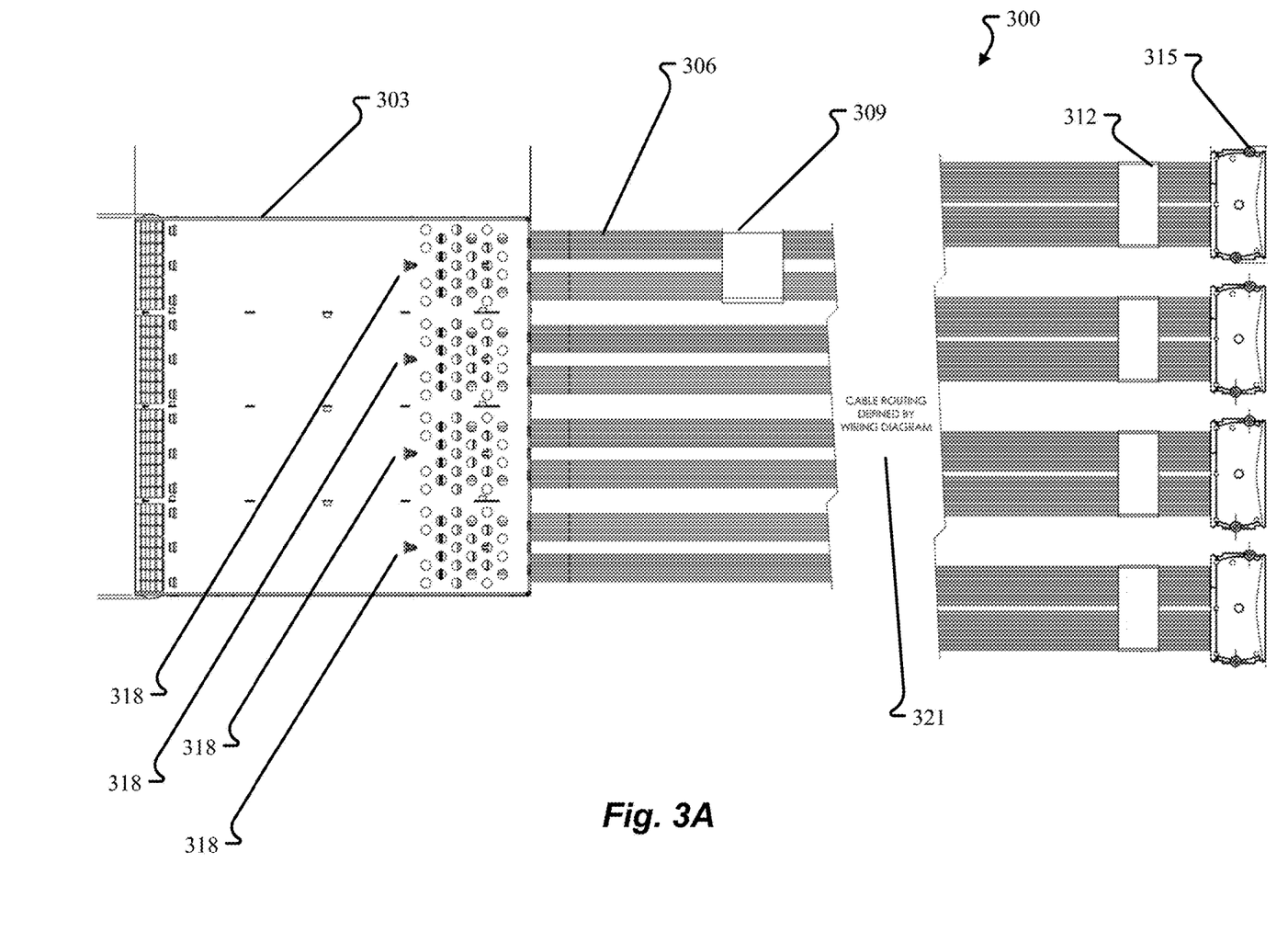
FIG. 3A is an illustration of a connector device in accordance with one or more embodiments of the present disclosure.

As illustrated in FIG. 3A, a connection system 300 may comprise one or more cage-side connectors 318, a plurality of cables 306, and one or more PCB-side connectors 315.

A label 309, 312 may be affixed to one or more cables 306 and may be used to aid a user in connecting the connection system 300 into a computer device.

The cage-side connectors 318 illustrated in FIG. 3A are each plugged into a one-by-four OSFP module 303. The one-by-four OSFP module 303 may comprise a one-by-four OSFP connector. While a one-by-four OSFP module 303 is illustrated, it should be appreciated other formats may be used, such as a one-by-one OSFP connector or any type of cable connection system, including, but not limited to, OSFP, QSFP, QSFP-DD, etc.

Each of the cage-side connectors 318 may comprise OSFP pluggable modules 318 each with a set of eight cables 306. The breakaway portion 321 of FIG. 3A illustrates that each cable of each set of cables 306 may be routed to any one of the one or more PCB-side connectors 315. For example, a first lane of a first OSFP pluggable module 318 may be connected to a first PCB-side connector 315 while a second lane of the first OSFP pluggable module 318 may be connected to a second PCB-side connector 315.

Furthermore, and as described in detail bellow, each cable may be a particular length. The length of each cable may be based in relation to a distance between the pluggable module and the PCB within the computer device being used as described below.

The PCB-side connectors 315 may comprise, for example, a connection device configured to mate with a portion of a PCB such as a surface mount connector.

Figure 3B:
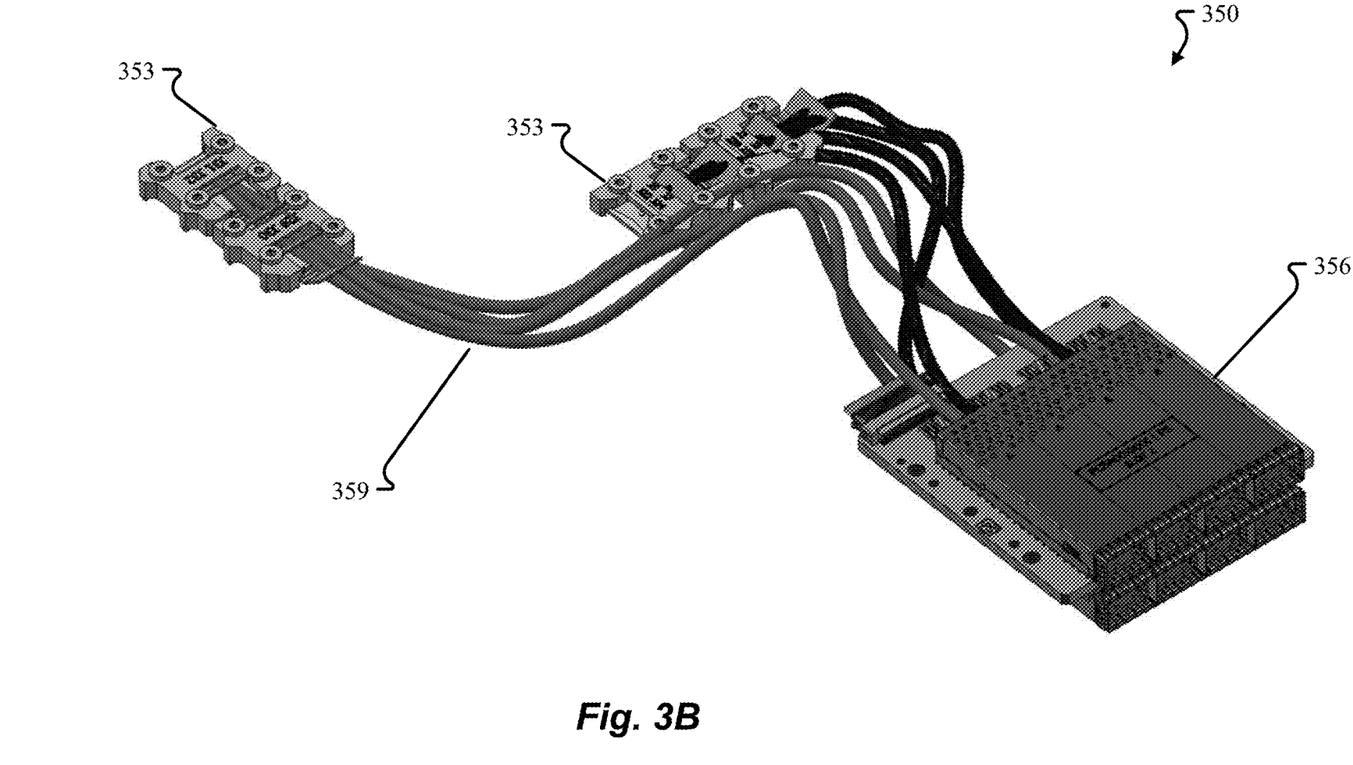
FIG. 3B is an illustration of a connector device in accordance with one or more embodiments of the present disclosure.

As illustrated in FIG. 3B, cables 359 may be used to connect a cage-side connector 356 to one or more PCB-side connectors 353. While the example connection system 350 illustrated in FIG. 3B comprises one cage-side connector 356 and two PCB-side connectors, it should be appreciated the same or similar connection system 350 may be used to connect any number of cage-side connectors 356 to any number of PCB-side connectors.

It should also be appreciated each illustrated cable 359 may comprise a plurality of lanes or conductors. For example, a cable 359 may be an insulated coaxial cable or other type of multi-channel connector. The cables may be copper cables, or other types of physical medium, optical cables, or some combination thereof.

Each cable may be configured to operate as one or more lanes for OSFP, QSFP, or another interconnect standard. For example, a first cable may be associated with a first lane of a quad small form-factor pluggable (QSFP) transceiver. The connector system may be configured to connect a first lane of an OSFP transceiver from a cage-side connector to a first breakout via the first cable and a second lane of the OSFP transceiver from the cage-side connector to a second breakout via the second cable.

Figure 4A:
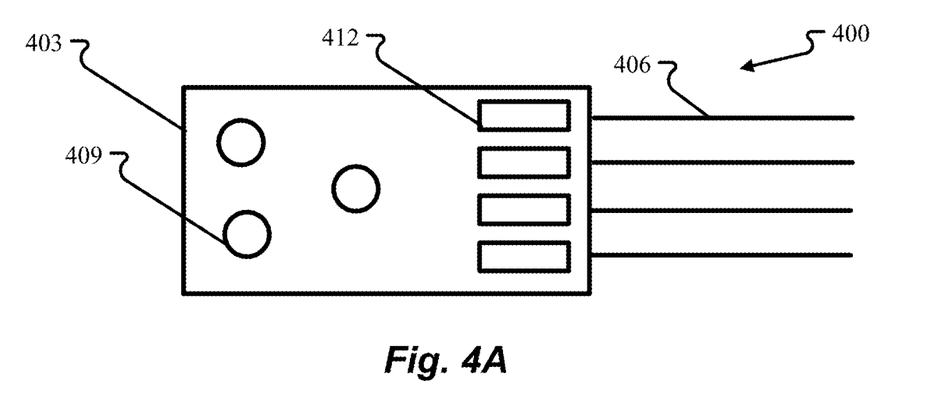
FIG. 4A is an illustration of a portion of a connector device in accordance with one or more embodiments of the present disclosure.

In some embodiments, PCB-side connectors may be keyed to aid users in correctly mounting the PCB-side connectors to a PCB. for example, as illustrated in FIG. 4A.

As illustrated in FIG. 4A, a connector system 400 may comprised one or more keyed PCB-side connectors 403. A PCB-side connector 403 may comprise one or more keys 409. Each key 409 may be, for example, an extrusion or recess which may match a recess or extrusion on a breakout or header portion of a PCB.

Figure 4B:
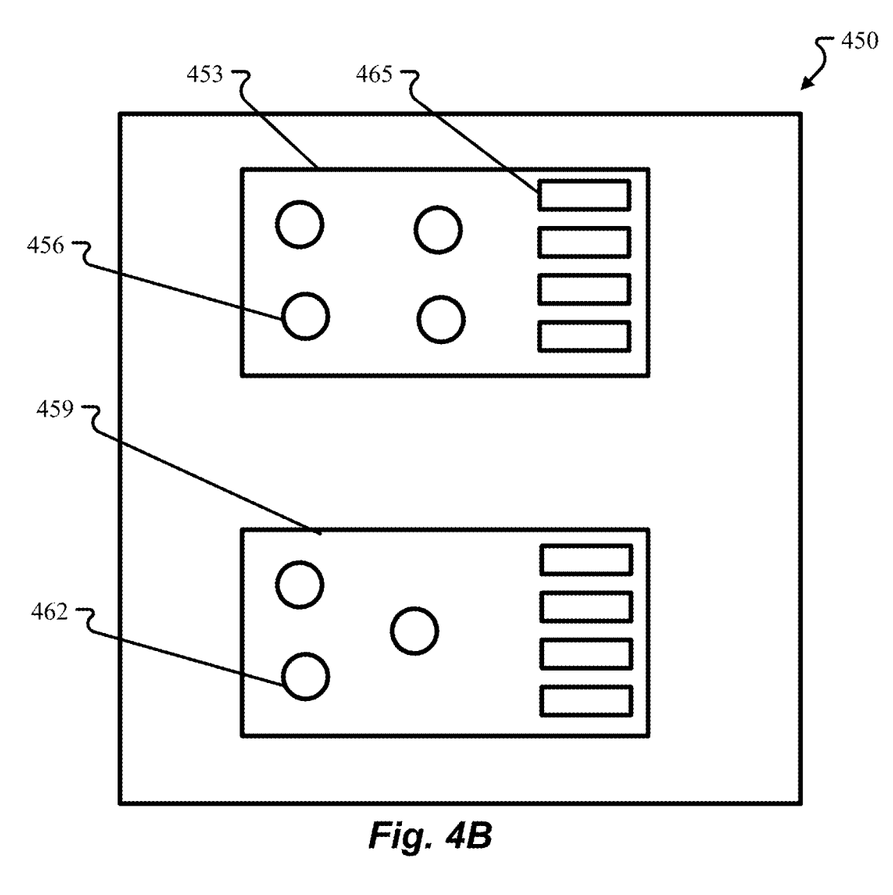
FIG. 4B is an illustration of a printed circuit board in accordance with one or more embodiments of the present disclosure.

Keys 409 may be designed to mate with keyed portions 456, 462, of a PCB 450 as illustrated in FIG. 4B. For example, a PCB-side connector 403 may be paired with a portion 462 of the PCB 450 such that the pair include plug and socket pairs with unique mechanical profiles capable of being mated with each other in only a particular orientation and which do not allow mating with connectors of other designs.

A PCB-side connector 403 may be connected to one or more cables 406. Cables 406 as illustrated in FIG. 4A are examples of cables 359 as illustrated in FIG. 3B. A PCB-side connector 403 may connect each of one or more cables 406 to one of one or more contacts 412.

For example, a first PCB-side connector may comprise one or more keys of a first pattern and a second PCB-side connector comprises one or more keys of a second pattern. The first one or more keys may align with one or more holes associated with a first breakout on a PCB and the second one or more keys may align with one or more holes associated with a second breakout on the PCB.

As illustrated in FIG. 4B, a PCB 450 may comprise one or more breakouts or headers 453, 459 designed to mate with one or more PCB-side connectors 403.

A breakout on the PCB may be keyed to ensure no cable is mis plugged. For example, each breakout or header 453, 459 may comprise a pattern of keyed portions 456, 462.

Each breakout or header 453, 459 may also comprise contact elements 465 such that when a PCB-side connector 403 is attached to a breakout or header 453, 459, contact elements 412 on the PCB-side connector 403 contact the contact elements 465 to enable the flow of data from cables 406 connected to the PCB-side connector 403 to components on the PCB 450.

Figure 5:
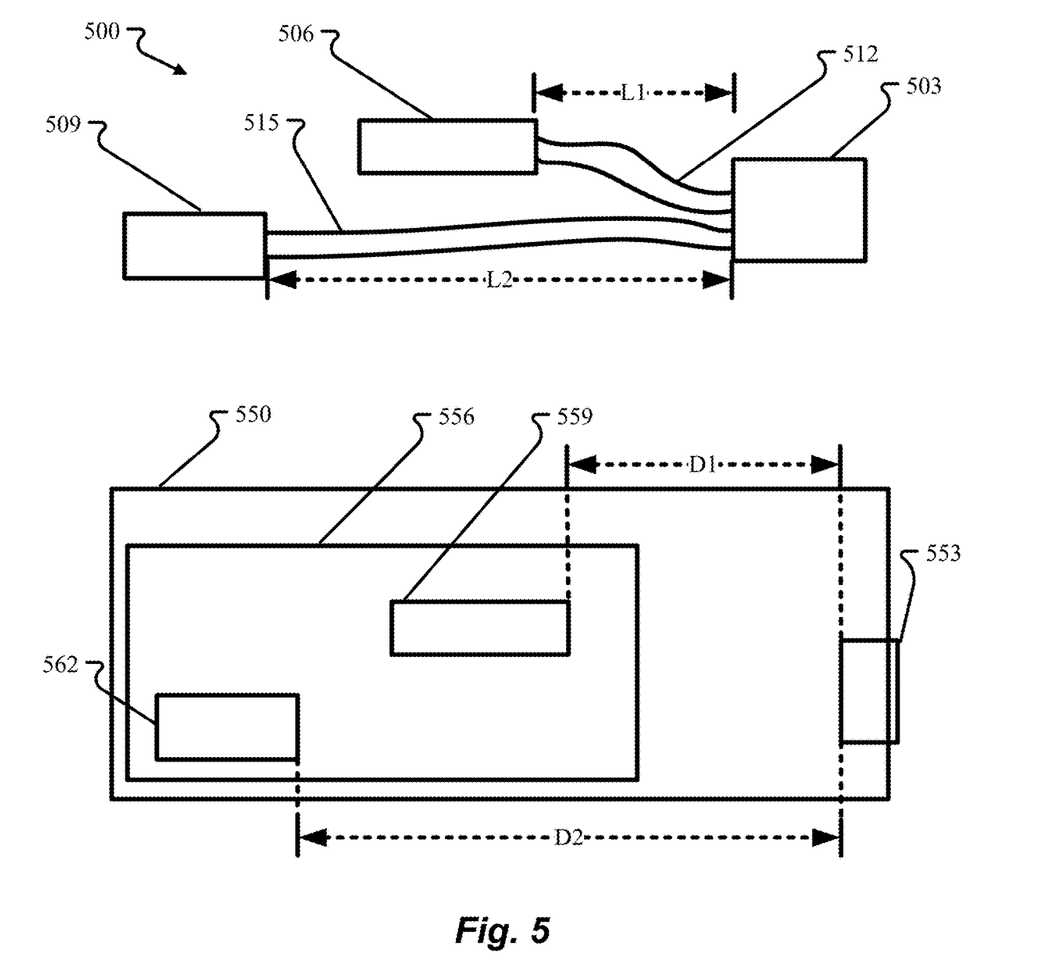
FIG. 5 is an illustration of a connector device and a computing in accordance with one or more embodiments of the present disclosure.

As illustrated in FIG. 5, a connector system 500 may comprise one or more cage-side connectors 503 and one or more PCB-side connectors 506, 509. The cage-side connector(s) 503 may be connected to each of the PCB-side connector(s) 506, 509 by one or more cables 512, 515. Cables 512, 515 as illustrated in FIG. 5 are examples of cables 359 as illustrated in FIG. 3B.

Each cable 512, 515 may be a particular length, L1, L2, corresponding to a distance, D1, D2, associated with a distance between a pluggable module 553 and a particular breakout or header 559, 562 of a PCB 556 of a computing system 550 as illustrated in FIG. 5.

When a PCB 556 is installed in a computing device 550, each breakout or header 559, 562 may be a particular distance, D1, D2, from a pluggable module 553 on, for example, a wall of a case or cage of the computing device 550. A connector system 500 may be designed such that each cable 512, 515, may be long enough to connect each PCB-side connector 506, 509 to a proper header 559, 562 on the PCB 556 of the computing device 550 without excessive slack. Such a connector device 500 both aids a user in ensuring each cable 512, 515 is connected to a proper header 559, 562 (as the user can quickly ascertain whether a cable 512, 515, should be connected to a particular header 559, 562 based on the length of the cable 512, 515), as well as ensures each cable 559, 562 is no longer than necessary. Ensuring each cable 559, 562 is no longer than necessary enables a computing device 550 to have better organization and airflow as well as shortens the distance data must travel to reach the breakout or header 559, 562 from the pluggable module 553.

Each cable may be a particular length to match a distance between the cage-side connector and the PCB-side connector which the cable is designed to mate. For example, a first cable may be longer than a second cable if the distance between cage-side connector and the PCB-side connector which the first cable is designed to mate is greater than the distance between the cage-side connector and the PCB-side connector which the second cable is designed to mate.

The distance between the cage-side connector and each PCB-side connector with which the cable is designed to mate may be based on a location of the cage-side connector and a breakout location on a PCB where the PCB-side connector is designed to be connected.

In certain embodiments, a PCB-side connector may be configured to connect to a breakout, a header, or other type of connector on the PCB.

Breakouts may be configured to mate with OSFP and/or QSFP connectors. For example, a breakout may comprise four or eight contact points configured to receive and transmit data to and from an OSFP, QSFP, or other type of connector.

Figure 6A:
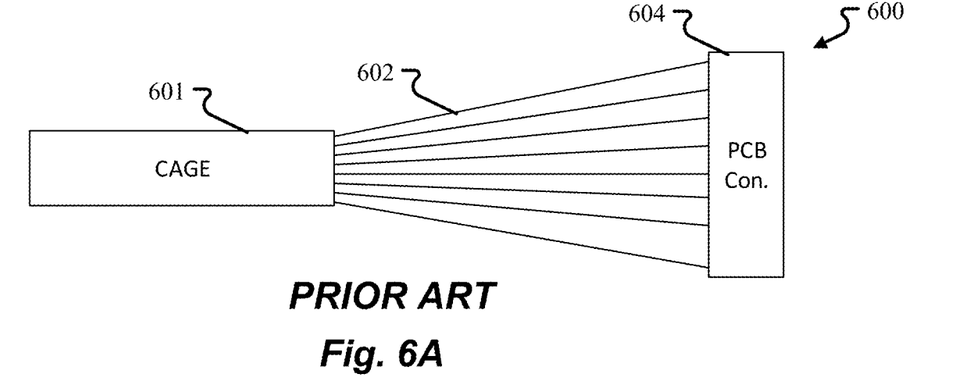
FIG. 6A is a wire diagram of a conventional connection system.

As illustrated in FIG. 6A, a connector system 600 conventionally comprises a single cage-side connector 601 with eight lanes or cables 602 connected to a single PCB-side connector 604.

Figure 6B:
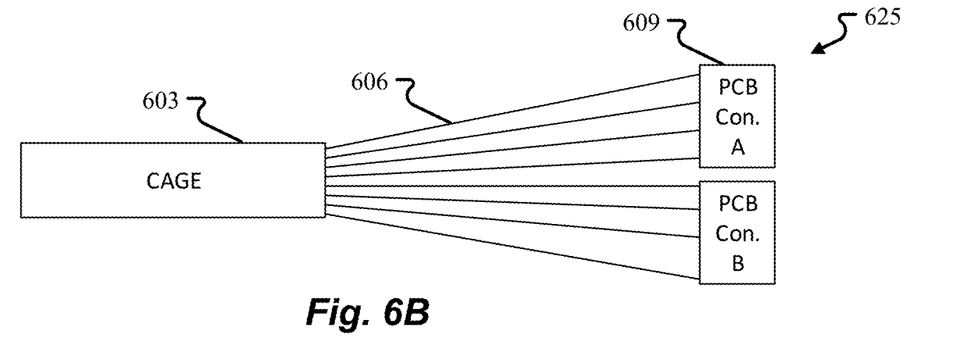
FIGS. 6B-D are wire diagrams in accordance with one or more embodiments of the present disclosure.

As illustrated in FIG. 6B, a connector system 625 may in some embodiments comprise one cage-side connector 603 with four of eight lanes or cables 606 connected to a first of two PCB-side connectors 609 and four of the eight lanes or cables 606 connected to a second of two PCB-side connectors 609.

The cage-side connector may be connected to a set of eight lanes or cables 606. A first PCB-side connector 609 may be connected to four of the set of eight lanes or cables 606 and a second PCB-side connector 609 may be connected to a different four of the set of eight lanes or cables 606.

Figure 6C:
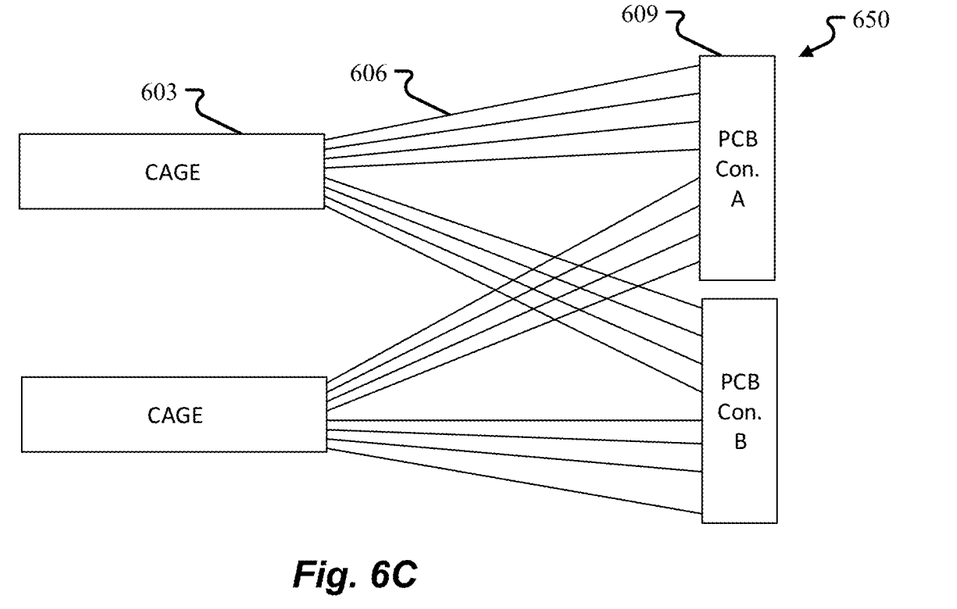

As illustrated in FIG. 6C, a connector system 650 may comprise two cage-side connectors 603, each with four of eight lanes or cables 606 connected to each of two PCB-side connectors 609.

A first cage-side connector may be connected to a first set of eight lanes or cables 606. A second cage-side connector may be connected to a second set of eight lanes or cables 606. A first PCB-side connector 609 may be connected to four of the first set of eight lanes or cables 606 and to four of the second set of eight lanes or cables 606. A second PCB-side connector 609 may be connected to a different four of the first set of eight lanes or cables 606 and a different four of the second set of eight lanes or cables 606.

Figure 6D:
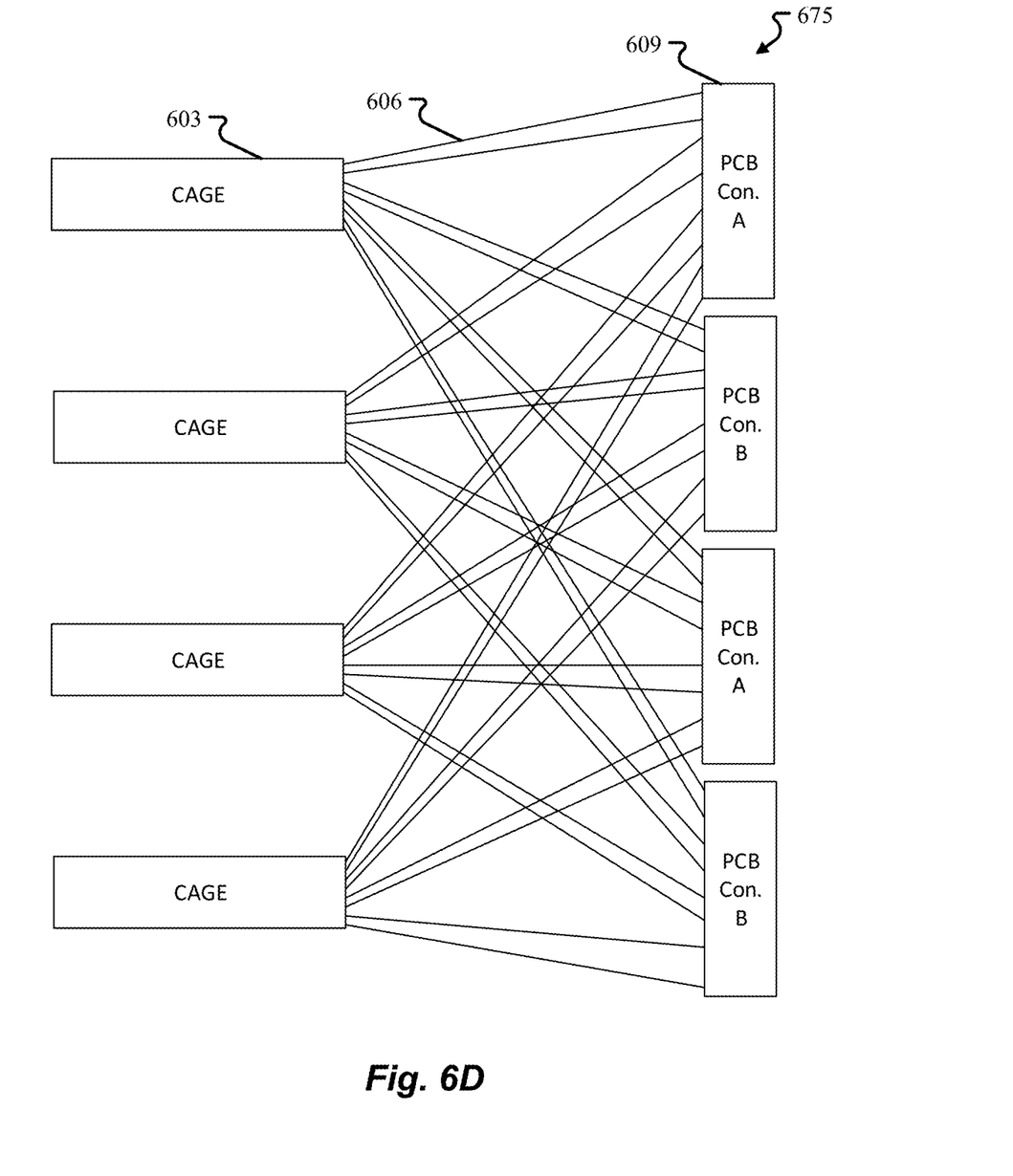

As illustrated in FIG. 6D, a connector system 675 may comprise four cage-side connectors 603, each with two of eight lanes or cables 606 connected to each of four PCB-side connectors 609.

A first cage-side connector may be connected to a first set of eight lanes or cables 606, a second cage-side connector may be connected to a second set of eight lanes or cables 606, a third cage-side connector may be connected to a third set of eight lanes or cables 606, and a fourth cage-side connector may be connected to a fourth set of eight lanes or cables 606.

A first PCB-side connector 609 may be connected to two of the first set of eight lanes or cables 606, to two of the second set of eight lanes or cables 606, to two of the third set of eight lanes or cables 606, and to two of the fourth set of eight lanes or cables 606.

A second PCB-side connector 609 may be connected to two of the first set of eight lanes or cables 606, to two of the second set of eight lanes or cables 606, to two of the third set of eight lanes or cables 606, and to two of the fourth set of eight lanes or cables 606.

A third PCB-side connector 609 may be connected to two of the first set of eight lanes or cables 606, to two of the second set of eight lanes or cables 606, to two of the third set of eight lanes or cables 606, and to two of the fourth set of eight lanes or cables 606.

A fourth PCB-side connector 609 may be connected to two of the first set of eight lanes or cables 606, to two of the second set of eight lanes or cables 606, to two of the third set of eight lanes or cables 606, and to two of the fourth set of eight lanes or cables 606.

Using a connector system such as one of the connector systems illustrated in FIGS. 6B, 6C, and 6D, a designer of a computing system, such as an ethernet switch, may be enabled to quickly swap out a PCB within the computing system or to quickly alternate between different routing configurations by switching cables as opposed to redesigning a PCB.

While in each of the examples illustrated in FIGS. 6B-D each cage-side connector 603 is connected to eight lanes or cables 606, it should be appreciated a cage-side connector 603 may be connected to any number of lanes or cables 606. Similarly, while in each of the examples illustrated in FIGS. 6B-D each PCB-side connector 609 is connected to four or eight lanes or cables 606, it should be appreciated a PCB-side connector 609 may be connected to any number of lanes or cables 606.

As described herein, a computing system in which a PCB may be connected to pluggable modules in such a way as to enable users to connect a single pluggable module to multiple breakouts on the PCB and/or a single breakout on the PCB to multiple pluggable modules.

Such a computing system may comprise one or more external ports such as a pluggable module for OSFP, QSFP, etc. Inside the computing system, a PCB may be installed.

As described herein, a PCB of a computing system may comprise one or more breakouts or headers. Each breakout may be a particular distance from each of the one or more external ports of the computing system. For example, a first breakout may be a first distance from the external port and a second breakout may be a second distance from the external port.

Each breakout may comprise a set of one or more headers or contact points. For example, each breakout may be configured to mate with a plurality of cables. Mating with a plurality of cables may comprise a PCB-side connector connecting the plurality of cables to a breakout.

Each breakout may comprise a set of holes in a pattern. For example, the first breakout may comprise one or more holes in a first pattern, and the second breakout may comprise one or more holes in a second pattern.

The PCB may comprise one or more application-specific integrated circuits (ASICs) or other PCB-mounted components.

Each breakout of the PCB may be configured to accept one or more of an OSFP connector, a QSFP connector, or other type of connector. In some embodiments, the PCB may be a multi-layer PCB configured to mate with a plurality of OSFP connectors.

The computing system may further comprise a connector system connecting the external port to the PCB.

The connector system may comprise one or more cage-side connectors, each connected to an internal side of one or more external ports. A cage-side connector may be, for example, one or more of an OSFP connector, a QSFP connector, a QSFP-DD connector, and an OSFP-XD connector.

The cage-side connector may be configured to mate with one or more of an OSFP pluggable module and a QSFP pluggable module.

The connector system may comprise one or more PCB-side connectors. For example, a first PCB-side connector connected to the first breakout of the PCB and a second PCB-side connector connected to the second breakout of the PCB.

The connector system, comprising the cage-side connector, the first PCB-side connector, and the second PCB-side connector may be internal to the computing system.

Each of the PCB-side connectors may be keyed to match a paired breakout on the PCB. For example, the first PCB-side connector may comprise one or more pins in the first pattern and the second PCB-side connector may comprise one or more pins in the second pattern. The keys of the PCB-side connectors may align with one or more holes associated with breakouts on the PCB to ensure each PCB-side connector is connected to a paired breakout on the PCB.

The connector system may further comprise a plurality of cables.

For example, a first cable of the plurality of cables may be connected to a cage-side connector and to a PCB-side connector.

A length of the first cable may be set relative to the distance between the cage to which the cage-side connector connects and a header to which the PCB-side connector is designed to connect.

Similarly, a second cable of the plurality of cables may be connected to a cage-side connector and a second PCB-side connector. A length of the second cable may be set relative to the distance between the cage to which the cage-side connector connects and a header to which the second PCB-side connector is designed to connect. The length of the first cable may be greater or less than the second distance.

Cables of the connector system may be, for example, associated with particular lanes of a QSFP transceiver or other type of transceiver or receiver.

Each cable may in some embodiments be a copper cable. For example, each cable may be an electrical cable comprising one or more strands of copper. Each of the one or more strands of copper may be configured to mate with the first breakout.

In some embodiments, the connector system may comprise a third cable connecting a second cage to a first PCB-side connector and a fourth cable connecting the second cage to a second PCB-side connector. A length of the third cable may be an amount greater or less than a length of the fourth cable, and the second amount may be relative to a distance between a first breakout on the PCB and a second breakout on the PCB.

In some embodiments, the connector system may comprise a third and a fourth PCB-side connector, with a fifth cable connecting the first cage to the third PCB-side connector and a sixth cable connects the first cage to the fourth PCB-side connector.

The connector system may be used to connect a first lane of an OSFP transceiver from a cage-side connector to a first breakout via a first cable and a second lane of the OSFP transceiver from the cage-side connector to a second breakout via a second cable.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured according to the following:

(1) A connection system comprising:
a cage-side connector;
a first PCB-side connector;
a second PCB-side connector; and
a plurality of cables, wherein:
  a first cable of the plurality of cables is connected to the cage-side connector and the first PCB-side connector,
  a second cable of the plurality of cables is connected to the cage-side connector and the second PCB-side connector.
(2) The system of (1), wherein:
  a length of the first cable is an amount greater than a length of the second cable, and
  the amount is relative to a distance between a first breakout on a PCB and a second breakout on the PCB
(3) The system of (1) or (2), wherein the cage-side connector is one or more of an OSFP connector, a QSFP connector, a QSFP-DD connector, and an OSFP-XD connector.
(4) The system of (1) to (3), wherein the cage-side connector is a QSFP connector.
(5) The system of (1) to (4), wherein the cage-side connector is configured to mate with one or more of an OSFP pluggable module and a QSFP pluggable module.
(6) The system of (1) to (5), further comprising a second cage-side connector, wherein: a third cable connects the second cage to the first PCB-side connector, and a fourth cable connects the second cage to the second PCB-side connector.
(7) The system of (1) to (6), further comprising:
a third PCB-side connector; and
a fourth PCB-side connector, wherein:
  a fifth cable connects the first cage to the third PCB-side connector, and
  a sixth cable connects the first cage to the fourth PCB-side connector.
(8) The system of (1) to (7), wherein a length of the third cable is a second amount greater than a length of the fourth cable, and wherein the second amount is relative to the distance between the first breakout on the PCB and the second breakout on the PCB.
(9) The system of (1) to (8), wherein the first PCB-side connector comprises one or more keys of a first pattern and the second PCB-side connector comprises one or more keys of a second pattern.
(10) The system of (1) to (9), wherein the first one or more keys align with one or more holes associated with the first breakout on the PCB and the second one or more keys align with one or more holes associated with the second breakout on the PCB.
(11) The system of (1) to (10), wherein the first and second cables are copper cables.
(12) The system of (1) to (11), wherein the cage-side connector, the first PCB-side connector, and the second PCB-side connector are internal to a computing system.
(13) A connection system comprising:
a first cage-side connector;
a second cage-side connector;
a PCB-side connector; and
a plurality of cables, wherein:
  a first cable of the plurality of cables is connected to the first cage-side connector and to the PCB-side connector,
  a second cable of the plurality of cables is connected to the first cage-side connector and to the PCB-side connector,
  a length of the first cable is an amount greater than a length of the second cable, and
  the amount is relative to a distance between a first breakout on a PCB and a second breakout on the PCB.
(14) A system comprising:
an external port;
a PCB comprising:
  a first breakout, wherein the first breakout is a first distance from the external port; and
  a second breakout, wherein the second breakout is a second distance from the external port; and
a connector system connecting the external port to the PCB, the connector system comprising:
  a cage-side connector connected to an internal side of the external port;
  a first PCB-side connector connected to the first breakout of the PCB;
  a second PCB-side connector connected to the second breakout of the PCB; and
  a plurality of cables, wherein:
    a first cable of the plurality of cables is connected to the cage-side connector and to the first PCB-side connector,
    a second cable of the plurality of cables is connected to the cage-side connector and to the second PCB-side connector, a length of the first cable is relative to the first distance, and
a length of the second cable is relative to the second distance.
(15) The system of (14), wherein:
the first breakout comprises a first set of one or more headers, and
the second breakout comprises a second set of one or more headers.
(16) The system of (14) or (15), wherein:
the first breakout further comprises one or more holes in a first pattern, and
the second breakout further comprises one or more holes in a second pattern, and
the first pattern differs from the second pattern.
(17) The system of (14) to (16), wherein:
the first PCB-side connector comprises one or more pins in the first pattern, and
the second PCB-side connector comprises one or more pins in the second pattern.
(18) The system of (14) to (17), wherein:
the first PCB-side connector is configured to mate with the first breakout, and
the second PCB-side connector is configured to mate with the second breakout.
(19) The system of (14) to (18), wherein the length of the first cable is less than the second distance.
(20) The system of (14) to (19), wherein the first cable is associated with a first lane of a quad small form-factor pluggable (QSFP) transceiver.
(21) The system of (14) to (20), wherein the connector system connects a first lane of an OSFP transceiver from the cage-side connector to the first breakout via the first cable and a second lane of the OSFP transceiver from the cage-side connector to the second breakout via the second cable.
(22) The system of (14) to (21), wherein the first cable is an electrical cable comprising one or more strands of copper.
(23) The system of (14) to (22), wherein the one or more strands of copper are configured to mate with the first breakout.
(24) The system of (14) to (23), wherein the cage-side connector is an OSFP connector.
(25) The system of (14) to (24), wherein the cage-side connector is a QSFP connector.
(26) The system of (14) to (25), wherein the cage-side connector is configured to mate with one or more of an OSFP connector and a QSFP connector.
(27) The system of (14) to (26), wherein the PCB comprises an application-specific integrated circuit (ASIC).
(28) The system of (14) to (27), wherein the first breakout of the PCB is configured to accept an OSFP connector.
(29) The system of (14) to (28), wherein each of the first breakout and the second breakout are configured to accept OSFP connectors.
(30) The system of (14) to (29), wherein the PCB is a multi-layer PCB configured to mate with a plurality of OSFP connectors.
(31) The system of (14) to (30), wherein the first breakout is configured to mate with a plurality of cables, the plurality of cables comprising the first cable.

What is claimed is:

1. A connection system comprising:
a first cage-side connector;
a first PCB-side connector;
a second PCB-side connector; and
a plurality of cables, wherein:
a first cable of the plurality of cables is connected to the first cage-side connector and the first PCB-side connector, and
a second cable of the plurality of cables is connected to the first cage-side connector and the second PCB-side connector.

2. The system of claim 1, wherein:
a length of the first cable is an amount greater than a length of the second cable, and
the amount is relative to a distance between a first breakout on a PCB and a second breakout on the PCB.

3. The system of claim 1, wherein the first cage-side connector is one or more of an OSFP connector, a QSFP connector, a QSFP-DD connector, and an OSFP-XD connector.

4. The system of claim 1, wherein the first cage-side connector is a QSFP connector.

5. The system of claim 1, wherein the first cage-side connector is configured to mate with one or more of an OSFP pluggable module and a QSFP pluggable module.

6. The system of claim 1, further comprising a second cage-side connector, wherein:
a third cable connects the second cage-side connector to the first PCB-side connector, and
a fourth cable connects the second cage-side connector to the second PCB-side connector.

7. The system of claim 6, further comprising:
a third PCB-side connector; and
a fourth PCB-side connector, wherein:
a fifth cable connects the first cage-side connector to the third PCB-side connector, and
a sixth cable connects the first cage-side connector to the fourth PCB-side connector.

8. The system of claim 6, wherein a length of the third cable is an amount greater than a length of the fourth cable, and wherein the amount is relative to a distance between a first breakout on a PCB and a second breakout on the PCB.

9. The system of claim 1, wherein the first PCB-side connector comprises one or more keys of a first pattern and the second PCB-side connector comprises one or more keys of a second pattern.

10. The system of claim 9, wherein the one or more keys of the first pattern align with one or more holes associated with a first breakout on a PCB and the one or more keys of the second pattern align with one or more holes associated with a second breakout on the PCB.

11. The system of claim 1, wherein the first and second cables are copper cables.

12. The system of claim 11, wherein the cage-side connector, the first PCB-side connector, and the second PCB-side connector are internal to a computing system.

13. A connection system comprising:
a first cage-side connector;
a second cage-side connector;
a PCB-side connector; and
a plurality of cables, wherein:
a first cable of the plurality of cables is connected to the first cage-side connector and to the PCB-side connector,
a second cable of the plurality of cables is connected to the first cage-side connector and to the PCB-side connector,
a length of the first cable is an amount greater than a length of the second cable, and the amount is relative to a distance between a first breakout on a PCB and a second breakout on the PCB.

14. A system comprising:
an external port;
a PCB comprising:
  a first breakout, wherein the first breakout is a first distance from the external port; and
  a second breakout, wherein the second breakout is a second distance from the external port; and
a connector system connecting the external port to the PCB, the connector system comprising:
  a cage-side connector connected to an internal side of the external port;
  a first PCB-side connector connected to the first breakout of the PCB;
  a second PCB-side connector connected to the second breakout of the PCB; and
  a plurality of cables, wherein:
    a first cable of the plurality of cables is connected to the cage-side connector and to the first PCB-side connector,
    a second cable of the plurality of cables is connected to the cage-side connector and to the second PCB-side connector,
    a length of the first cable is relative to the first distance, and
    a length of the second cable is relative to the second distance.

15. The system of claim 14, wherein:
the first breakout comprises a first set of one or more headers, and
the second breakout comprises a second set of one or more headers.

16. The system of claim 15, wherein:
the first breakout further comprises one or more holes in a first pattern, and
the second breakout further comprises one or more holes in a second pattern, and
the first pattern differs from the second pattern.

17. The system of claim 16, wherein:
the first PCB-side connector comprises one or more pins in the first pattern, and
the second PCB-side connector comprises one or more pins in the second pattern.

18. The system of claim 17, wherein:
the first PCB-side connector is configured to mate with the first breakout, and
the second PCB-side connector is configured to mate with the second breakout.

19. The system of claim 14, wherein the length of the first cable is less than the second distance.

20. The system of claim 14, wherein the first cable is associated with a first lane of a quad small form-factor pluggable (QSFP) transceiver.

* * * * *